Figure 10:
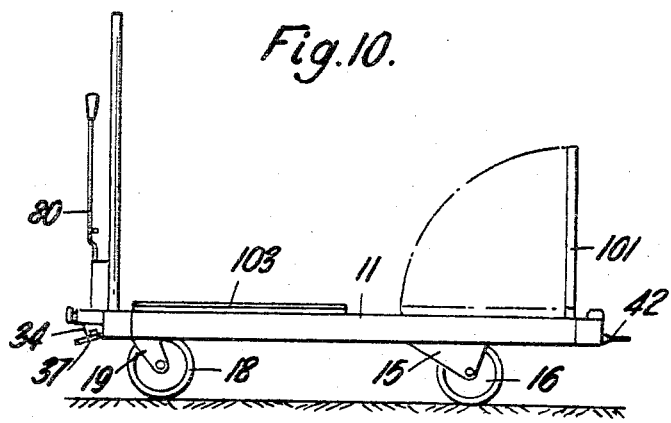

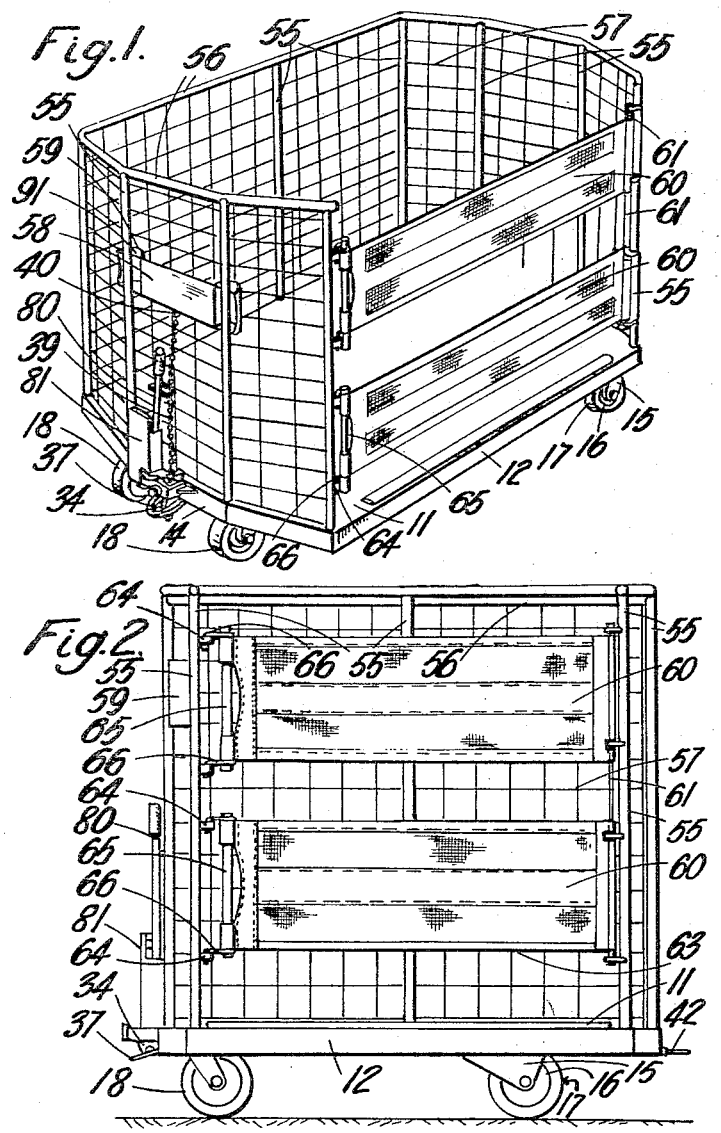

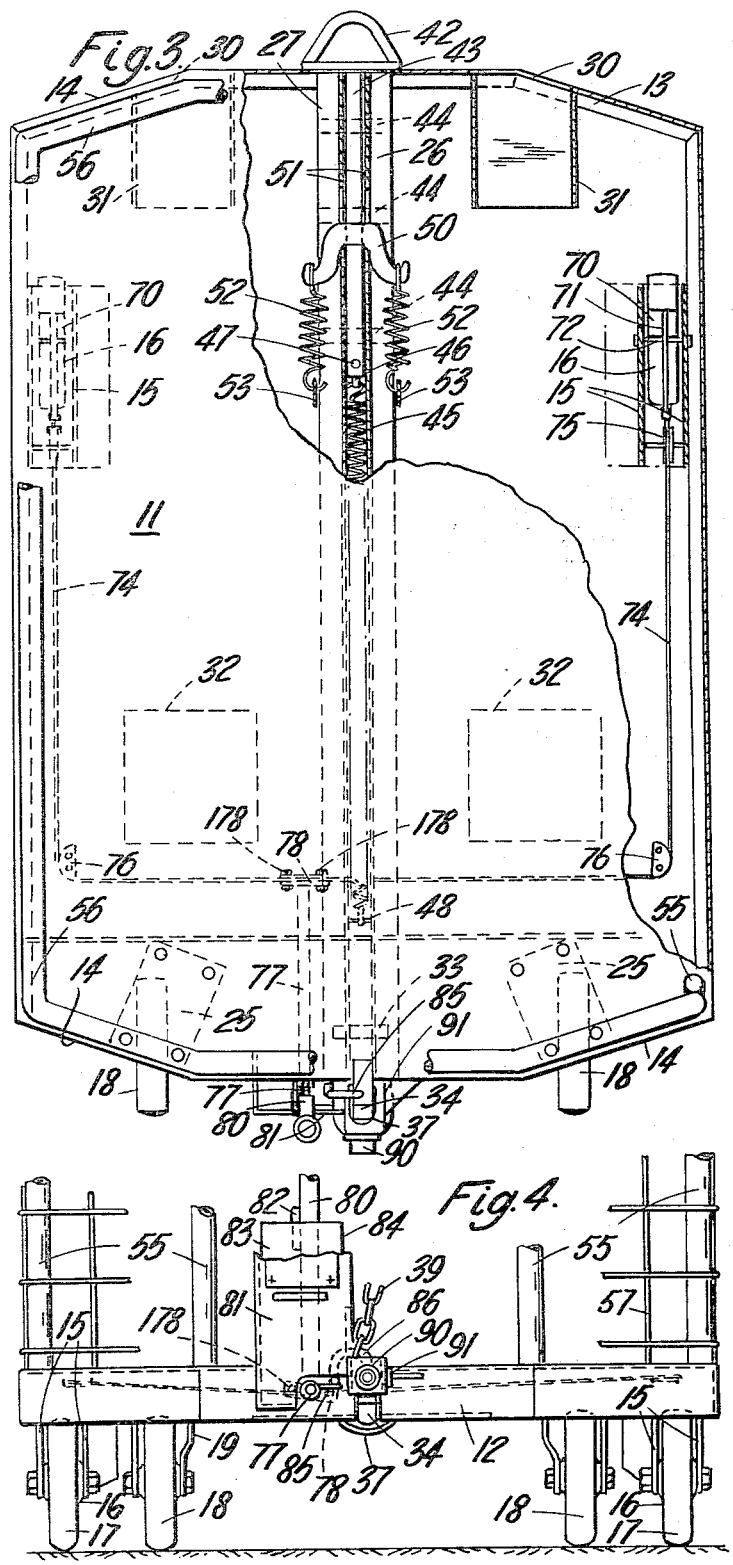

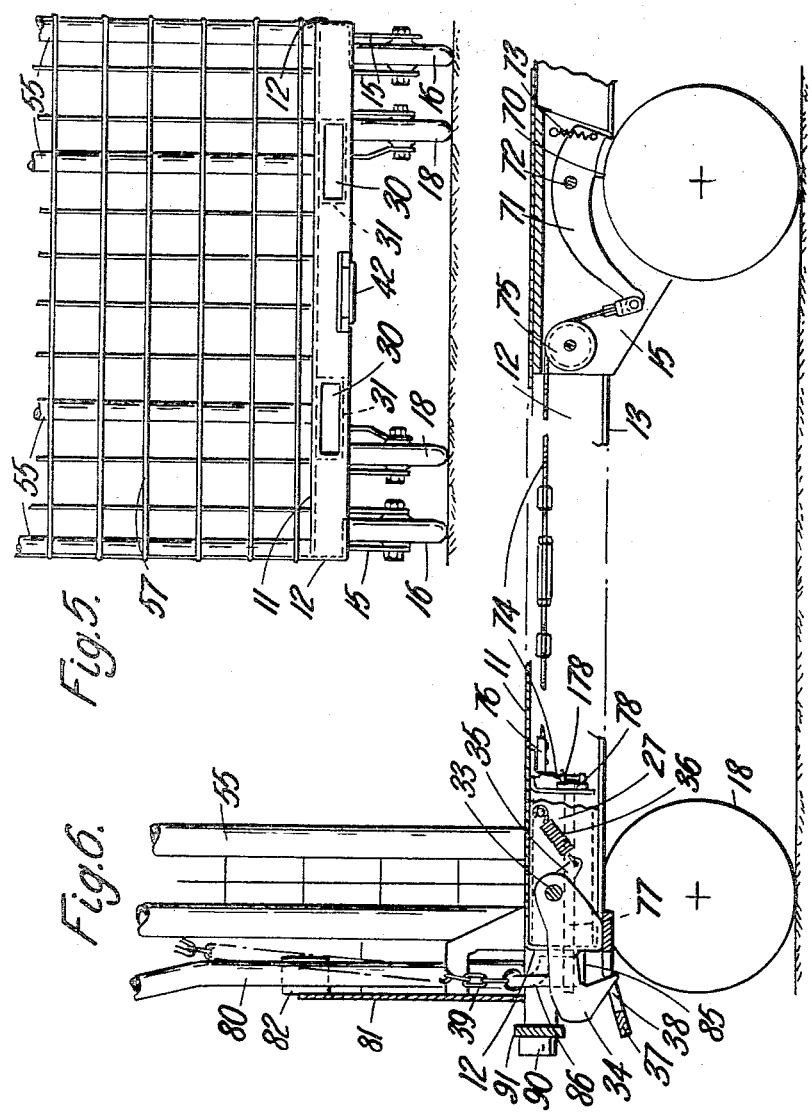

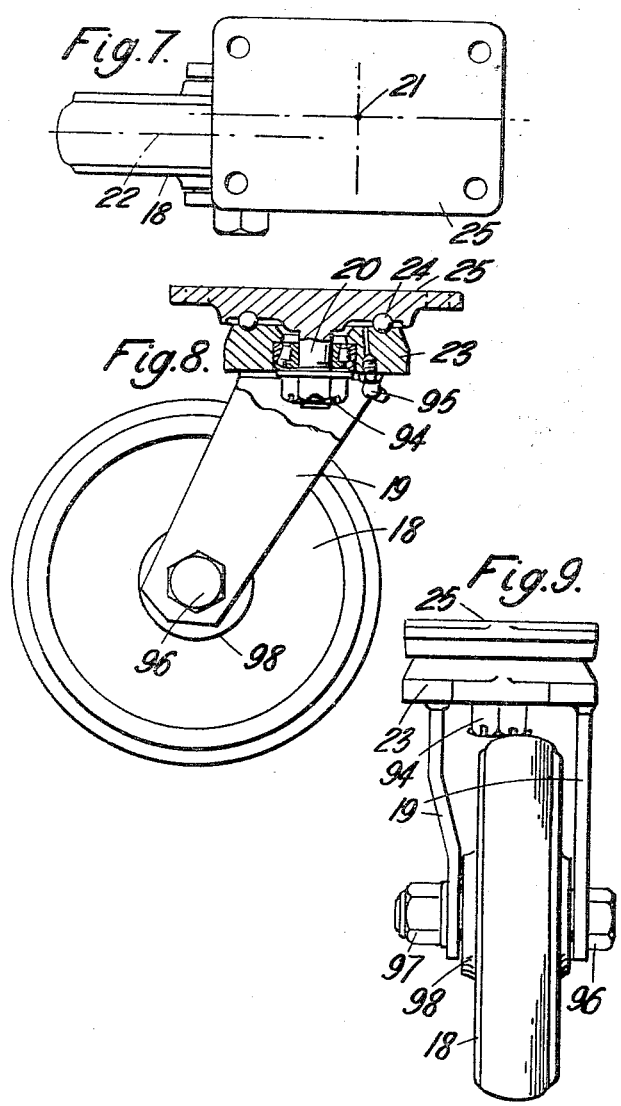

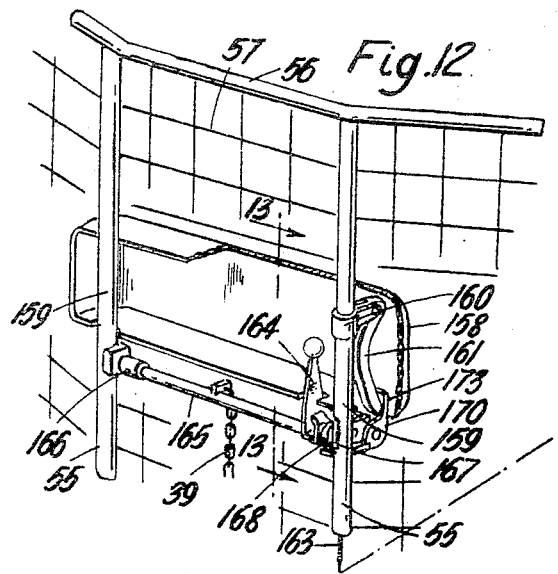
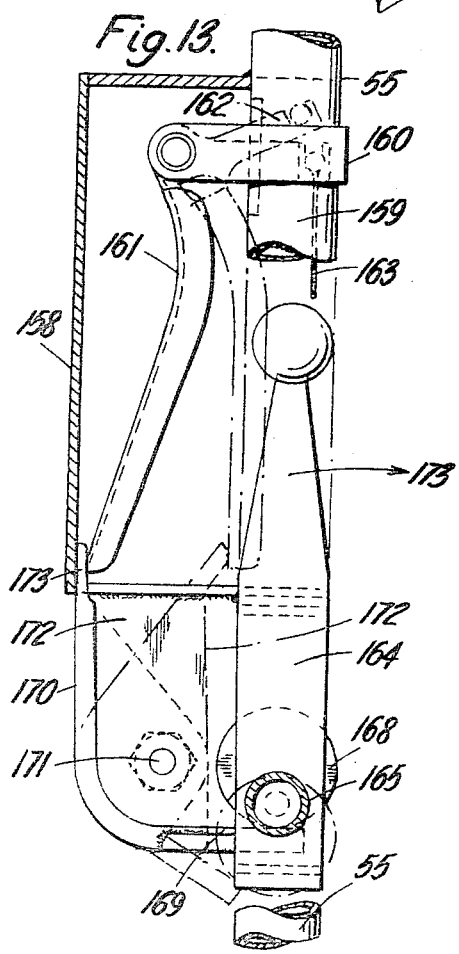

United States Patent Office 3,313,378
Patented Apr. 11, 1967

3,313,378
HITCH CONSTRUCTION FOR WHEELED TROLLEYS
Dennis Henry Freeman and Gordon Jeffery, Basingstoke, William Edwin Weaver, Wallasey, and Gordon Christopher Yardley Holland, Swindon, England, assignors to Lansing Bagnall Limited, Hampshire, England, a British company
Filed June 9, 1964, Ser. No. 373,705
Claims priority, application Great Britain, June 17, 1963, 24,091/63
2 Claims. (Cl. 188—21)

This invention comprises improvements in or relating to wheeled platform and like trolleys.

It is an object of the invention to provide an improved trolley which is intended for the transport of goods and packages on railway station platforms and in like situations by hand, for loading into rail vans and road vehicles, and which is capable of being coupled up to form a train of trolleys to be towed by a tractor or other motor vehicle.

According to the invention a wheeled trolley comprises in combination a body comprising a sheet-metal floor, stiffening members extending longitudinally beneath the floor on each side of the centre portion thereof, with a space between them, drawbar gear located in said space and ground wheels below the floor, the construction being such as to afford spaces for the insertion of fork-arms of a fork-lift truck below the floor at at least one end of the floor on each side of the longitudinal stiffening members.

The drawbar gear may comprise an eye at one end of the trolley and a hook or equivalent at the other, the hook or eye being carried on a drawbar which has a spring connection to the body, the hook and eye being such as to engage automatically with the eye or hook, as the case may be, of another similar trolley if the two trolleys are brought together end to end with their front ends facing in the same direction.

The ground wheels may be castor wheels at the front end of the trolley and wheels on fixed axles at the rear end thereof, the spaces for the insertion of the fork-arms being at the rear end. This ensures that if a number of trolleys are picked up one after another by a fork-lift truck and carried to a place where a train of them is being assembled the trolleys are automatically presented one after another to the train with their front ends facing in the same direction. It also enables the fork truck to present the trolley through a van door with the castor wheels leading so that it can be readily moved by an operator about the floor of the van.

Preferably the ends of the floors of the trolleys are chamfered off or curved at the corners (as viewed in plan) to reduce the radius of the minimum turning circle of a train of the trolleys. The edges of the floor may be stiffened by being flanged downwardly all round and flanged inwardly to form channel section edges and this has the further advantage of partly enclosing and protecting the mechanism underneath the floor.

In one form of trolley in accordance with the invention there is an upstanding bolster at one end of the floor only, leaving the sides and the other end open to facilitate the placing upon the floor of large loads. In another form there is an upstanding enclosing structure which surrounds the ends and one side of the floor and the other side is closable by readily removable horizontal straps or the like which may be spring-loaded or made of elastic material.

Further features of the invention comprises a brake gear which includes a form of gate to facilitate its correct operation and means for engaging and disengaging the hook and eye connections on the drawbar. Preferably the castor wheels are of a type in which the wheel is offset in two planes, that is to say the wheel axle is offset behind the plane of the castoring axis, as is usual, and also the plane of the wheel is offset to one side of the castoring axis. The wheels may be provided with polyurethane or like treads to reduce noise and preferably they are mounted on ball or roller bearings which are sealed to eliminate the necessity for frequent lubrication.

Figure 11:
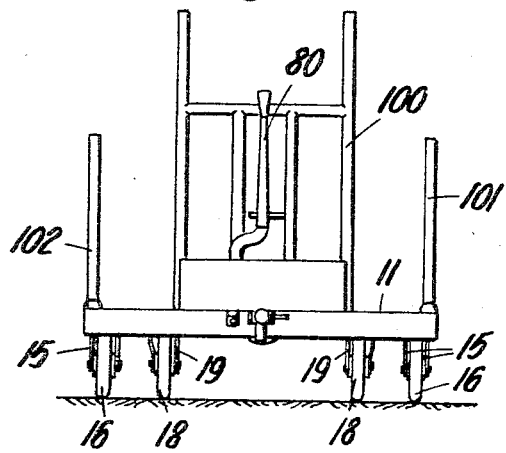

The following is a description, by way of example, with reference to the accompanying drawings, of one construction in accordance with the invention:
In the drawings:
FIGURE 1 is a perspective view of a trolley;
FIGURE 2 is a side elevation of the same;
FIGURE 3 is a plan;
FIGURE 4 is an end elevation of the lower part of the front end of the trolley;
FIGURE 5 is an end elevation of the lower part of the rear end;
FIGURE 6 is an enlarged longitudinal section showing parts of the automatic coupling hook and of the brake gear;
FIGURES 7, 8 and 9 are details of the castor wheels;
FIGURE 10 is a side elevation of an alternative trolley;
FIGURE 11 is an end elevation thereof;
FIGURE 12 is a perspective view of a modified construction of hand brake, and
FIGURE 13 is a vertical section upon the line 13—13 of FIGURE 12, looking in the direction of the arrows.

A trolley is provided, the main structural element of which consists of a metallic flat floor 11 stiffened with downwardly extending flanges 12 all round. The bottom edges of the flanges 12 are turned inwardly as shown at 13, FIGURE 3, so that the stiffening flanges are in effect channel-shaped. The floor 11 is rectangular except that at each end the corners are chamfered off as shown at 14 to reduce the radius of the minimum turning circle of a train of trolleys. At one end there are fixed brackets 15 for ground wheels 16 and the ground wheels are covered with polyurethane tyres 17. At the other end there are castor wheels 18 and the track of the castor wheels is narrower than that of the fixed ground wheels to a substantial extent as will be clear from FIGURES 3, 4 and 5. Each of the castor wheels 18 (which are also tyred with polyurethane or its equivalent) is mounted on a castor yoke 19 so that its vertical central plane 22 (FIGURE 7) is displaced about ½" from the axis 21 of its castoring pivot 20 (FIGURES 7 to 9) and when the trolley is being towed, the offset plane 22 of each of the castors lies towards the outside of the trolley. The castor yoke 19 has a head portion 23 which is mounted to rotate under a horizontally disposed ball race 24. The ball race is secured to the platform 11 by a flange 25. It is found that the offset position of the castor wheels in relation to the fixed wheels and the towing coupling facilitates a train of trolleys being towed without any tendency to "snake."

Below the floor plate of the trolley towards its longitudinal centre line there are located two channel members 26, 27 (FIGURE 3) which are welded to the underside of the floor and serve to stiffen it. These channel members are arranged back to back with a space between them. At one end of the floor 11 the downturned flange is pierced with large rectangular openings 30, one on each side of the central space which is occupied by the channel members 26, 27, the two openings (seen in FIGURES 3 and 5) being spaced apart suitably to enable the arms of a forklift truck to enter beneath the floor and to lift the trolley when it is desired to raise it from the ground and deposit it, say, on the floor of a railway van beside the platform, or to lift it off a lorry or the like and lower it to the platform. Behind the openings 30 under the floor there are welded to the floor sheet metal guide members 31, seen in FIGURE 3, which help to direct the forks of a fork-lift truck when they are inserted at 30. There are pads 32 of metal plate welded to the underside of the floor which are intended to engage the tips of the fork arms and take the wear and distribute the force exerted by the fork arms on the underside of the floor.

At the opposite end of the trolley from that where the openings 30 for the fork-arms are provided, there is a crosspin 33 (FIGURE 6) which extends between the webs of the channel members 26, 27 and on this pin there is fitted the shank of an automatic coupling hook 34. The hook is made with its point extending downwardly and there is a tail-piece 35 secured to the hub of the hook where it encircles the crosspin to which a spring 36 is secured which tends to draw the point of the hook downwardly. The point part of the hook extends out through the end flange of the floor 11 and overlies a sloping V-shaped fixed member 37 with an opening 38 in it to receive the point of the hook 34. The end outer surface of the hook slopes downwardly and inwardly toward the truck as shown and thus if it comes in contact with a co-operating member, such as a horizontal eye on the end of another trolley, it will tend to rise, against the action of its spring 36. A chain 39 is affixed to the top portion of the hook above the aforesaid sloping front face and this chain extends upwardly to a fixing point 40 on the superstructure as hereinafter described. A pull on the chain will lift the hook 34, but if the chain is left slack the spring 36 on the hub of the hook will draw the point of the hook 34 downwardly into the opening in the plate 37 above-mentioned.

At the other end of the trolley there is a triangular eye 42 fixed on a drawbar 43 (see FIGURE 3) and the drawbar enters the space between the backs of the channels 26, 27 at that end of the trolley. The height of the eye 42 is such that if another trolley is pushed towards it with its hook and facing the eye, the eye 42 will be above the level of the sloping plate 37 aforesaid on the other trolley. On engagement of the hook 34 with the end of the eye 42, the eye will force the hook upwardly and as soon as the point of the hook has passed over the eye it will drop down, by its own weight and the action of the spring 36 to hold the trolleys together.

The drawbar 43 extends along the space between the backs of the channel members 26, 27 for a sufficient distance to guide it effectively and it rests on plates 44 which are welded beneath the lower flanges of the channel members. The space between the backs of the channel members is deeper than it is wide and the drawbar is located so that there is a space between the channel members above the drawbar. On the drawbar is an upstanding pin 47 which extends up into this space. The end of the drawbar is drawn in under the floor of the trolley by a tension spring 45 which is hooked into an eye 46 drilled in the end of the drawbar and extends along the space between the channel members for a substantial part of the length of the trolley, as far as a crosspin 48 to which it is hitched. Thus, the drawbar 43 is connected by the spring 45 to the trolley. It is necessary however that a less yielding element than this spring should resist the movement of the drawbar after it has been partially drawn out from its space beneath the floor; to this end there is a balance lever 50 provided, which extends horizontally through longitudinal slots 51 cut in the backs of the channel members and projects into the spaces between the top and bottom flanges of the channel members. As will be seen the balance lever 50 overlies the drawbar 43. It is drawn back against the innermost ends of the horizontal slots 51 through which it passes by two horizontal springs 52, stronger than the spring 45 attached to the end of the drawbar 43. The springs 52 are anchored to suitable lugs 53 welded to the underside of the floor 11. Before any pull is placed on the drawbar there will be a certain amount of lost motion, as shown in FIGURE 3, between the pin 47 which stands up from the drawbar and the edge of the balance lever 50 which faces it. As a result, when a pull is applied to the eye on the drawbar, the drawbar at first yields relatively easily under the effect of the central tension spring 45 which is located between the backs of the channel members. As soon as the lost motion has been taken up further movement is resisted not only by the central spring 45 but by the springs 52 attached to the balance lever; therefore the latter part of the movement of the eye will be more firmly resisted.

Around three sides of the floor 11 of the trolley there is an upstanding tubular framework comprising uprights 55 welded to a top rail 56 and this framework serves to keep goods on the trolley without slipping. A strong wire mesh 57 is used to fill in the spaces between the uprights 55.

The chain 39 which serves to disengage the hook of the automatic coupling extends upwardly to a fastening 40 on a crossbar 58 extending between two of the uprights 55 at the front of the trolley above the coupling. It is long enough to allow the coupling to engage but the operator of the trolley can disengage the coupling by pulling upwardly on the chain. That side of the trolley which is left without any of the tubular framework 55–56 protecting it, permits goods to be easily loaded on to the trolley. When loaded this opening is closed by horizontal straps 60 made of reinforced canvas material, drawn across it. There are two straps, one end of each being looped around an upright bar 61 carried by one of the uprights 55 at the side of the opening. The straps 60 are provided at the other side of the opening with detachable fastenings. These take the form of four eyes 64 welded to the adjacent upright 55 of the tubular framework and the free ends of the upper and lower straps 60 are each attached to a tubular handle 65 provided with a pair of hooks 66 arranged to engage a pair of the eyes 64 on the upright 55. The operator, grasping the handle 65, draws it toward the eyes 64 and threads the two hooks 66 downwardly into them, thus fastening each of the pairs of straps.

Each of the two rear wheels 16 of the trolley is provided with a parking brake. This consists of a curved steel brake pad 70 (FIGURE 6) shaped to fit the exterior of the nylon tyre of the wheel and mounted on a lever 71 which is pivoted at 72 to the bracket which carries the ground wheel to be braked. A tension spring 73 tends to pull the lever off and the other end of the lever is connected to a cable 74 which runs over a pulley 75 on the bracket 15. The two cables 74 from the two brake pads run over guides 76 (seen in FIGURE 3) to a lever 78 on a rockshaft 77 located beneath the floor 11 of the trolley at the front end a little to one side of the channel members 26, 27 and this lever carries a pair of spaced projections 178 for operating the cables. The front end of the rockshaft 77 projects forwardly through the downturned flange 12 at the front of the trolley and carries an upstanding brake handle 80. This handle is protected in its lower part by a sheet metal casing 81. As the rockshaft 77 is offset from the centre of the trolley the upper part of the handle is offset toward the centre and the portion near the top of the metal casing 81 carries a small projecting plate 82 which controls its movements, the tubular handle being springy enough to be manipulated past the casing. When the handle is moved, the plate 82 engages either the edge 83 of the casing, holding the brake "on" or the edge 84 of the casing, holding it "off." As it is located close to the chain 39 which operates the coupling it is convenient for the operator to manipulate both controls as he desires. The arrangement is interlocked by a lever 85 on the rockshaft 77 so that when the brakes are applied the coupling is automatically released. To this end, the lever 85 underlies a lateral projection 86 from hook 34 and when the lever 80 is moved to the left, as viewed in FIGURE 4, the lever 85 lifts the projection 86 and with it the hook 34. This prevents trolleys from being towed with the brakes on. Also if trolleys are loaded into a railway van, the brakes are put on and this prevents them coupling automatically together by accident inside the van.

A rubber buffer 90 is mounted on a bracket 91 at the front of the trolley to take up slack in the coupling and eliminate noise when the trolleys are coupled together into the form of a train.

The crossbar 58 to which chain 39 is attached acts as a destination board at the front end of the trolley. The end portions of the plate are curved inwardly toward the loading space of the trolley so that they form guards 59 around the front two of the uprights 55. The parts of the uprights so guarded from hand-holds for pushing the trolley and the guards 59 prevent goods coming into contact with the hands of the operator when the trolley is being pushed manually. The guard spaces are closed at the top and bottom by horizontal plates 91 which are welded to the uprights and serve to support the guards and the destination board.

The construction of the caster wheels is shown in detail in FIGURES 7 to 9. The plate 25 which supports the castoring axle-pin 20 is formed with a groove for a ball-race for balls 24, concentric with the pin 20. The rotating head 23 of the brackets 19 has a corresponding groove to engage the underside of the balls. On the pin 20 and within the head 23 are conical-roller race members 92, 93 which take radial loads and shocks. A nut 94 on the pin 20 holds the parts in place and a lubricant nipple 95 enables the ball and rolled bearings to be lubricated. The wheel 18 has a hub 98 which encloses roller or ball bearings for the wheel to run on, and which are retained in place by a bolt and nut 96—97. The central plane 22 of the wheel is offset from the centre of pin 20 and the castor wheels are made, one left-hand and one right-hand, as to the direction in which they are offset, as can be seen from FIGURES 4 and 5. This ensures that these trolleys will run without side-sway and if they are in a train they will not "snake" or otherwise fail to follow the leading truck smoothly.

Referring to FIGURES 10 and 11, these show a truck with floor 11 and wheels 16, 18 and end couplings and brake gear as already described, but there are no rails and posts around the floor 11. At one end is an upstanding frame 100 to support the brake handle and allow the truck to be pushed along. The rest of the floor is open and flat but at the rear corners are two hinged bars 101 which can be hinged down flat as indicated in chain line. There are also wooden raves 103 extending partly along the sides of the floor 11. This truck can be used either with the posts 101, 102 lying flat, to carry large flat loads, or with the posts up, as described; in the latter case they prevent loads such as bales from slipping off the floor 11.

The modification shown in FIGURES 12 and 13 shows a construction in which instead of the crossbar 58 and guards 59 around the uprights 55, and the brake-operating handle 80, there is a guard 158 which is shaped like a tray turned on its side and is welded to the inner sides of the uprights 55, the mesh 57 being interrupted in front of the guard 158 so that it leaves the portions 159 of the uprights which cross the rim-portions of the guard free to be used as hand-holds. A bracket 160 supports a lever 161 which hangs down behind one of the hand-holds 159 and this lever has an arm 162 which enters a vertical slot in the back of the hand-hold. Here it is attached to a cable 163 which passes down the inside of the corresponding upright 55 and is connected to a lever (not shown) which is carried on the rockshaft 77 which operates the cables 74 and brake pads 70. If the truck is being pushed by the hand-holds 159, the fingers of the person pushing the trolley will naturally extend behind the lever 161 and if he finds the trolley tends to move too quickly down a slope, he can easily grip the lever and so put the brake on, the lever 159 thus being brought into the chain-line position shown in FIGURE 13.

A parking-brake lever 164 is provided to take the place of handle 80. This lever is welded to a horizontal tubular bar 165 journalled in brackets 166, 167 on the uprights 65. An eccentric cam 168 is also welded to the lever 164 and it bears on a tail 169 of an intermediate lever 170 pivoted at 171 on a vertical plate 172 welded beneath the underside of the guard 158. The upper end 173 of lever 170 lies behind the lower end of lever 161 and if the parking-brake lever 164 is pulled toward the operator (in the direction of the arrow 173, FIGURE 13) the cam 168 will move the intermediate lever 170 into the chain-line position shown in FIGURE 13 and put on the brake, whether the lever 161 is being grasped or not.

We claim:

1. A wheeled trolley comprising a body having a generally rectangular floor with chamfered corners, the chamfer at each corner extending for about a quarter of the width of the floor, an extendable spring-loaded drawbar, two pairs of ground wheels of which one pair are castor wheels, two interengageable coupling members of which one of said coupling members is fixed at one end of the floor and the other said coupling member is located at the other end of the floor and is mounted on said drawbar, the said two coupling members projecting only a short distance beyond the end of the floor and such that, when one of said coupling members is coupled to the other of said coupling members of a similar trolley and during turning with progressively decreasing radius, the two trolleys can first come into contact at the inner ends of the chamfers at one side and further decrease in radius can then be permitted by rocking movement between the trolley about the point of contact accompanied by extension of said drawbar.

2. A trolley as claimed in claim 1 and including brake gear comprising a longitudinally extending rockshaft which projects from the floor at the end of the trolley adjacent the fixed coupling member, an operating lever on the rockshaft extending upward therefrom, means associated with the operating lever to retain it in the "on" or "off" position, brake pads on brake-applying levers in operative relation to the wheels mounted on fixed axles, cables from said brake-applying levers which extend to the rockshaft and a lever operatively connecting the cables to the rockshaft, the trolley also including an interlock between the brake gear and the fixed coupling member and comprising a lever attached to the said rockshaft of the brake gear which lever precludes the fixed coupling member from engaging the other coupling member of another trolley or a towing vehicle when the brake is "on."

References Cited by the Examiner
UNITED STATES PATENTS

| | | | |
|---|---|---|---|
| 1,494,077 | 5/1924 | Reichman | 280—486 X |
| 1,559,796 | 11/1925 | Shuey et al. | 188—167 |
| 1,870,633 | 8/1932 | Koehler | 280—79.1 |
| 2,195,636 | 4/1940 | Ulrich | 280—408 |
| 2,253,791 | 8/1941 | Kline et al. | 188—119 |
| 2,712,452 | 7/1955 | Hallowell et al. | 280—79.1 |
| 2,783,039 | 2/1957 | Wilson | 280—486 X |

LEO FRIAGLIA, *Primary Examiner.*